United States Patent [19]
Dimeff

[11] Patent Number: 5,337,617
[45] Date of Patent: Aug. 16, 1994

[54] GAS FLOW METER

[76] Inventor: John Dimeff, 5346 Greenside Dr., San Jose, Calif. 95127

[21] Appl. No.: 44,021

[22] Filed: Apr. 8, 1993

[51] Int. Cl.⁵ .............................................. G01F 1/24
[52] U.S. Cl. .................................................. 73/861.54
[58] Field of Search ............ 73/861.53, 861.54, 861.58

[56] References Cited

U.S. PATENT DOCUMENTS

| | | | |
|---|---|---|---|
| 701,382 | 6/1902 | Patten | 73/861.54 |
| 2,069,309 | 2/1937 | Henszey | 73/861.54 |
| 3,112,646 | 12/1963 | English. | |
| 3,357,244 | 12/1967 | English. | |
| 3,408,865 | 11/1968 | Ihenault | 73/861.54 |
| 3,691,834 | 9/1972 | DeFasselle et al. | |
| 3,933,040 | 1/1976 | Thompson. | |
| 4,304,136 | 12/1981 | McCabe et al. | 73/861.54 |
| 4,489,614 | 12/1984 | DeFasselle et al. | |
| 4,528,858 | 7/1985 | Dimeff. | |
| 4,787,253 | 11/1988 | de Fasselle et al. | |
| 5,024,105 | 6/1991 | Tentler et al. | 73/861.54 X |
| 5,115,684 | 5/1992 | Haeussler | 73/861.54 X |

Primary Examiner—Herbert Goldstein
Attorney, Agent, or Firm—Robert S. Kelly

[57] ABSTRACT

A gas flow meter includes a cylinder closed at its upper end and slidably supported within a bearing ring. The cylinder side wall is provided with openings. A gas flow is directed into the interior of the cylinder which causes it to rise with respect to the bearing ring and permitting the gas to flow out of the area of the openings exposed above the bearing. During a constant flow of gas through the cylinder the flow rate can be measured by the distance which the cylinder has moved upwardly as indicated on a fixed marker positioned adjacent to the cylinder. An electrical signal is also provided by means of an electrical sensor positioned axially within the cylinder.

16 Claims, 3 Drawing Sheets

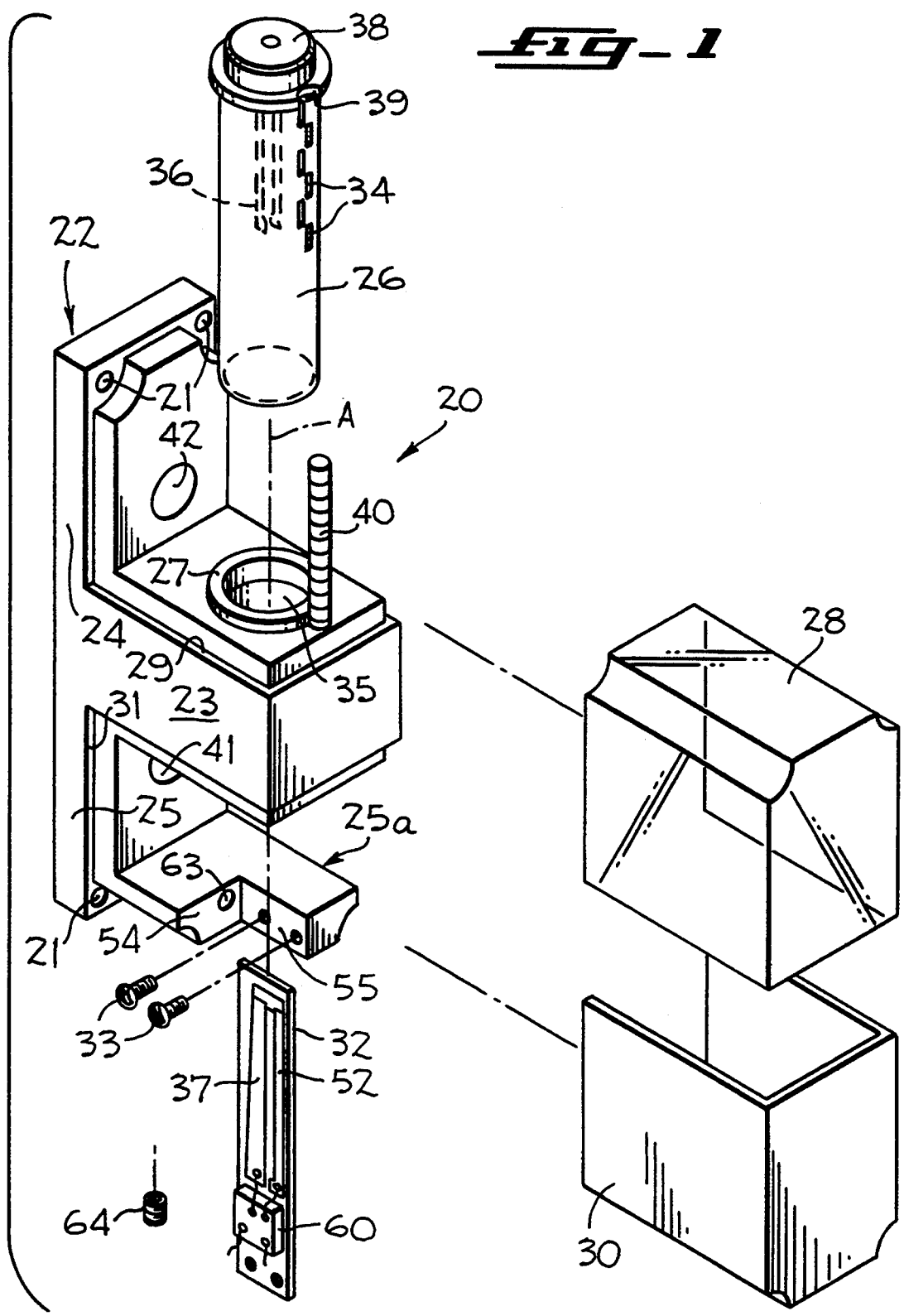
Fig_1

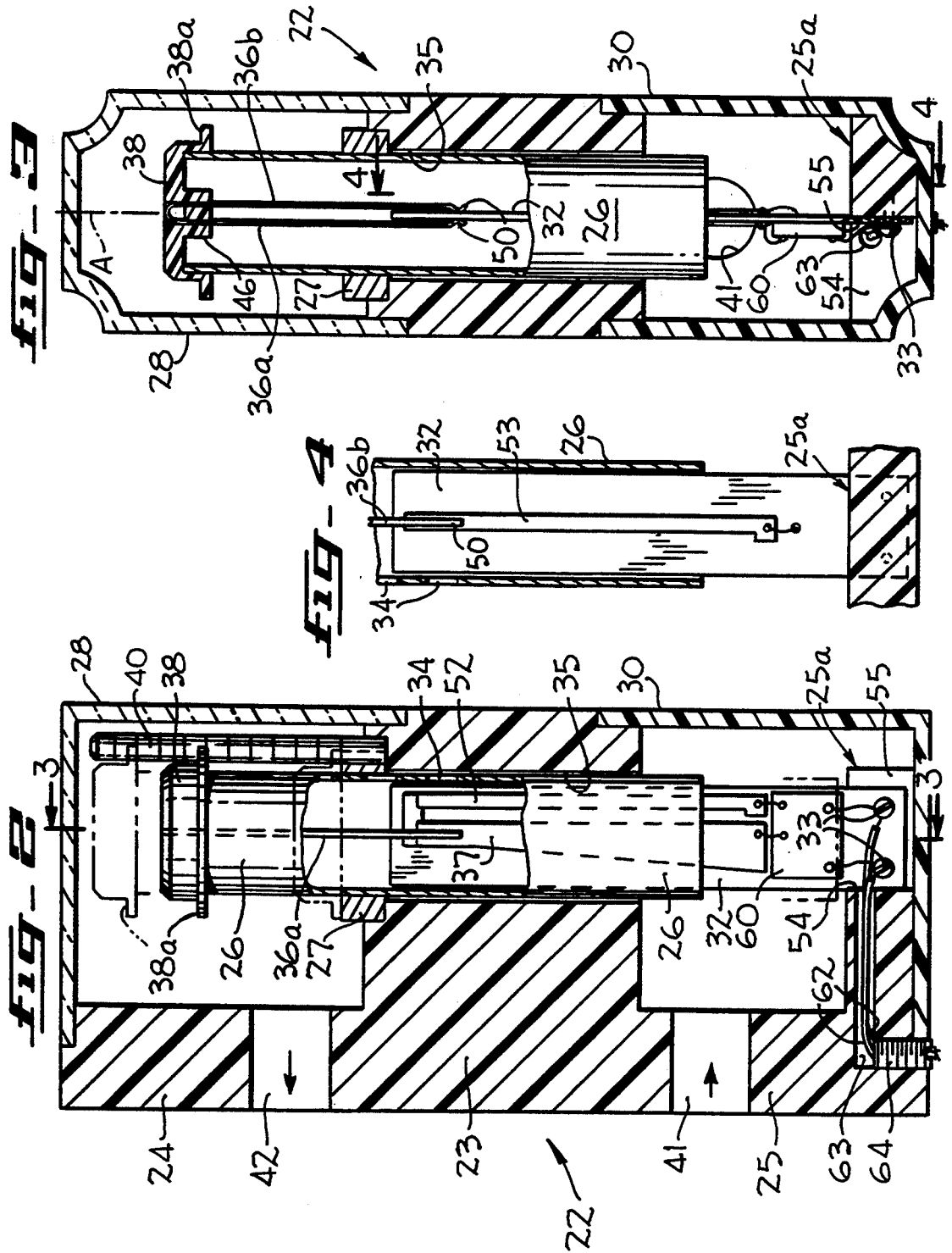

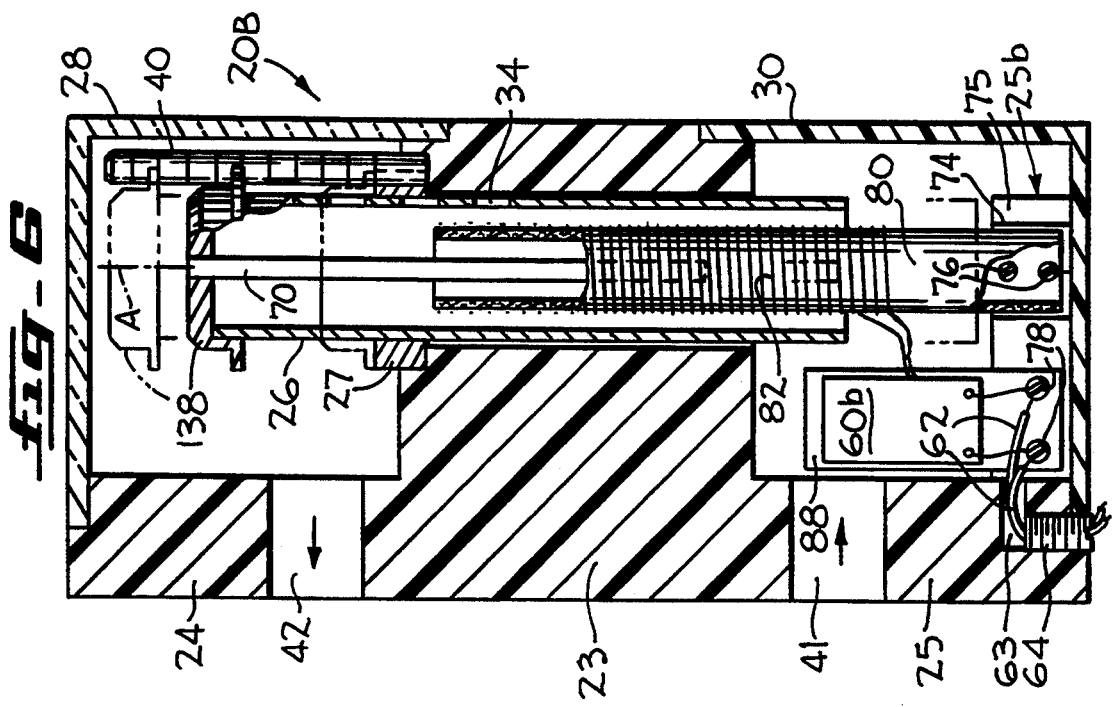
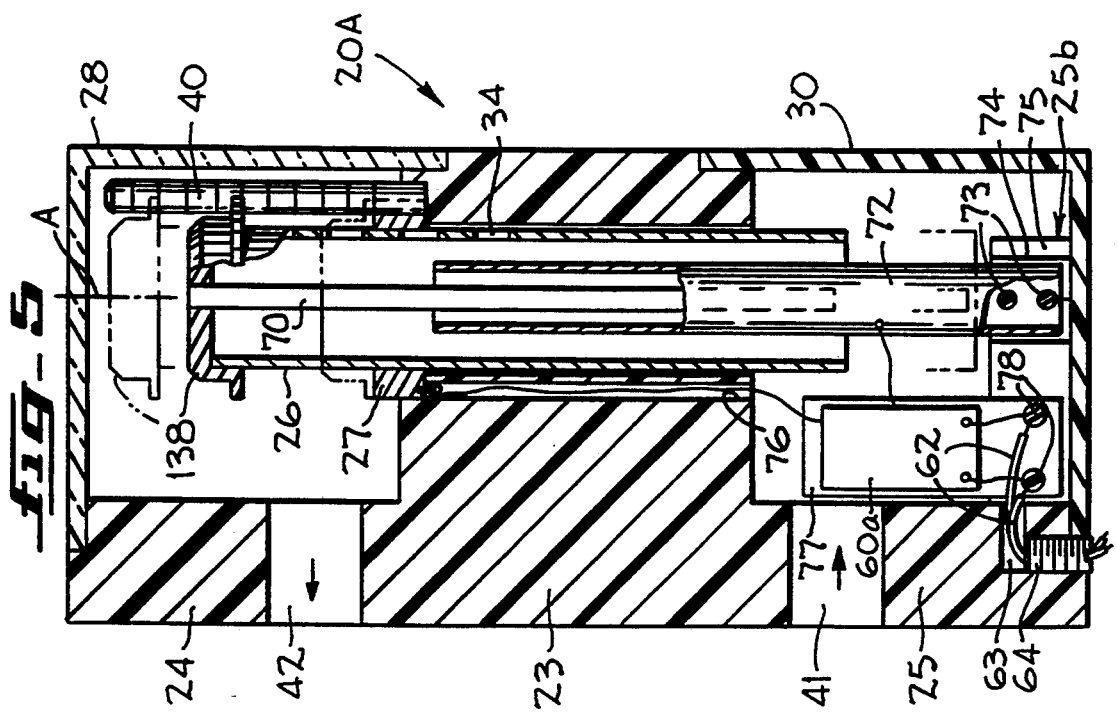

GAS FLOW METER

BACKGROUND OF THE INVENTION

1. Field of the Invention

The present invention pertains to gas flow meters, and more particularly, it pertains to gas flow meters of an electro-mechanical type wherein the differential pressure of gas flow through a pair of telescoping members elevates one of the members with the amount of such elevation being used as a gauge of the flow rate.

2. Description of the Prior Art

Gas flow meters as used by telephone companies provide some unique problems with regard to their construction. To prevent moisture damage to the individual telephone wires within the telephone cables, the cables are typically filled with dry air under pressure. In the event of a small break in the waterproof sheath surrounding the telephone wires, the pressurized dry air flows outwardly through the break preventing water penetration and continually drying the broken surfaces, but it is imperative that such leaks be detected and repaired early enough to prevent water damage to the cables and the telephone wires therein. Gas flow meters are thus used to measure the amount of gas flowing at many locations along the lengthy cable network and are continuously monitored in order to determine the location and severity of the break through which the air is leaking.

A long standing problem in the maintenance of such pressurized cable systems has been the search for a reliable low cost pressure meter for accurately sensing and indicating the relatively low rates of gas flow through such systems. Various transducers are available for measuring such gas flow through enclosed systems including devices which measure pressure drop across a structure presenting a known resistance to the flow of gas, rotation of a vane-like structure immersed in the gas, momentum transfer from the moving gas to a fixed body immersed therein, the positive displacement of pistons or nutating disks designed to allow a fixed volume of gas to pass from inlet to outlet during each compressive or rotational cycle of the piston or disk, and vertical displacement of a ball or other device moving upwardly within a transparent tube whose internal diameter increases with height and in which flow is directed upwardly (such device commonly being known as a "rotometer").

One particular type of flow meter which has been used for the reading of gas flow in pressurized cable systems is the telescoping member or floating piston type wherein flow through the meter creates a differential pressure to lift one member of a pair relative to the other thereby exposing an ever-increasing opening to the flow of gas. In such devices the amount of motion will be directly related to the amount of gas flow through the meter. For example, a device of such type is shown in my prior U.S. Pat. No. 4,528,858. As shown in this patent, the movable member may have an electrical contactor connected thereto to provide a continuous electrical signal to a remote monitor.

Another example of a variable area gas flow meter utilizing the floating piston or telescoping member construction is shown in prior U.S. Pat. No. 3,691,834 to deFasselle et al. In the meter disclosed in this patent, a floating piston contains an upper plate which is adapted to slide along a marked post thereby providing a visual reading of gas flow through the meter.

As shown in further prior patents to deFasselle et al, U.S. Pat. Nos. 4,489,614 and 4,787,253, the floating number may be connected to a sensing member so as to provide a continuous electrical output signal indicative of gas flow through the meter.

SUMMARY OF THE INVENTION

With the present invention a gas flow meter is provided which is relatively simple in structure and therefore inexpensive to produce and yet which is highly reliable in providing both a visual signal indicative of flow through the meter as well as an electrical signal directly proportional to the gas flow through the meter.

In general, the gas flow meter of the present invention includes a pair of telescoping cylinders with an opening, or series of openings, being provided in one of the cylinders so that as the differential pressure across the meter causes one of the cylinders to be elevated with respect to the other an ever increasing opening is provided to allow increased gas flow through the meter. Thus, the degree of elevation of the movable cylinder is directly indicative of the amount of gas flow through the meter.

It is a unique feature of the present invention that this flow is metered by means of a sensing member the movable portion of which depends axially from the movable cylinder to minimize the lateral force or moment acting upon such cylinder as a result of the friction necessarily introduced by the sliding contact between the movable and stationary portions of the sensing member thereby reducing the tendency of the cylinder to bind and providing an output free of the variable frictional forces which plague many of the prior art devices.

BRIEF DESCRIPTION OF THE DRAWINGS

FIG. 1 is an exploded isometric view of the gas flow meter of the present invention.

FIG. 2 is a central section through the gas flow meter of the present invention with the movable cylinder being shown in a raised position to permit gas flow through the meter and with the uppermost and lowermost positions of such movable cylinder being shown in dashed lines.

FIG. 3 is a section taken along line 3—3 of FIG. 2.

FIG. 4 is a partial section taken generally along line 4—4 of FIG. 3 and showing the rear side of the pc card and the sensing member.

FIG. 5 is a central section similar to FIG. 2 but showing a second embodiment of the gas flow meter of the present invention.

FIG. 6 is a further central section similar to FIGS. 2 and 5 but showing a third embodiment of the gas flow meter of the present invention.

DESCRIPTION OF THE PREFERRED EMBODIMENT

Referring first to FIG. 1, a gas flow meter 20 embodying the present invention is there shown in exploded view with the various components thereof being separated for ease of illustration. The meter will be seen to include a base 22 which, in the operation of the meter, is adapted to be mounted in a vertical position (by appropriate fasteners through the holes 21 at the four corners of the base) so that its central cylinder block portion 23 projects forwardly from lower and upper base sections 25, 24 mounting the base to receive gas inflow and outflow, respectively. A movable or floating cylinder 26 is slidably guided by means of a bearing ring 27 within a chamber 15 35 of the cylinder block 23 so that it may freely slide axially on the surface of the bearing ring. An upper cover 28 of transparent plastic materail is secured to the top of the cylinder block 23 and the upper section 24 of the face along a narrow edge 29, and similarly, a lower cover or housing 30 is secured to this cylinder block and lower portion 25 of the face along a narrow edge 31. It will be noted that the lower base section 25 includes a forwardly projecting portion 25a at the lower end thereof to which is attached, by means of a pair of screws 33, a pc board 32 containing the electrical sensor and electrical circuitry elements of the apparatus. The pc board is arranged to be mounted to the base so that it will project upwardly through the cylindrical chamber 35 in the cylinder block 23 and axially within the movable cylinder 26.

The float cylinder 26 will be seen from FIG. 1 to include a top cap 38 from which depends an electrical contactor 36 adapted to make engagement with a resistive potentiometer contact strip 37 on a flat face of the pc board 32. As also can be seen in FIG. 1, the wall of float cylinder 26 is provided with a plurality of vertically arranged openings 34 which permit passage of gas through the cylinder when the cylinder is elevated. A visual indicator pole 40 is mounted atop the cylinder block 23 parallel to the axis of the float cylinder 26 and is adapted to receive and guide the float cylinder by means of a notch 39 in a radially projecting flange 38a at the lower periphery of the cap 38.

In operation, gas flow will be directed through an entry port 41 in the lower base section 25 and thence into the interior of the float cylinder 26 which, in the absence of any gas pressure, will be in its lowermost position with the flange 38a of cap 38 resting atop the bearing ring 27. As gas pressure increases to initiate the flow of the gas through the meter, the cylinder 26 will be lifted from the bearing ring 27 thus allowing gas to pass through the uppermost portion of the uppermost of the openings 34 in its side wall, into the upper chamber of the meter and out through a port 42 in the upper base section 24. Although individual openings 34 are cut into the cylinder 26 rather than a single continuous vertical opening so as to increase the rigidity and strength of the cylinder, it will be noted that such openings 34 are continuous in the vertical direction so that each unit of elevation of the tube will expose a corresponding unit of area of the openings 34 permitting a corresponding increase in flow of gas through the meter. The cylinder 26 will continue to rise after gas flow is initiated until a sufficient number of openings 34 or a portion thereof are elevated above the bearing ring 27 to permit flow through the cylinder 26 at the system flow rate, i.e. the flow rate which is to be measured between input and output ports 41, 42. Flow connections may be made with the passages defining ports 41 and 42 (FIGS. 2 and 3) by any conventional means as, for example, by means of a pair of nipples having o-ring seals for sealing engagement with the walls of the passages.

As can be seen from FIGS. 2 and 3, the float cylinder 26 is arranged for sliding engagement only at the bearing ring 27. The float cylinder 26 is constructed of a polished stainless steel and the bearing ring of metallic material is precisely machined to provide clearance between cylinder 26 and ring 27 which is typically two thousandths of an inch or less. It is critical that this fit be loose enough to assure free movement of cylinder 26 with minimal friction and yet close enough to prevent any passage of gas between the outer face of the cylinder and the bearing ring 27 so that all flow must pass within the cylinder and out through the openings 34 to assure accuracy of the flow measurement. As can be seen from FIGS. 2 and 3, the axial passageway 35 within the cylindrical block 23 is very closely spaced from the outer surface of the float tube so as to insure the alignment thereof but so as to impose no continuous frictional forces thereon.

As can best be seen in FIG. 3, the cap 38 totally encloses the upper end of the float cylinder 26 so as to prevent any passage of gas therefrom. The cap is made of an insulating plastic material so that there will be no conduction between the electrical contactor 36 and the metallic cylinder 26 and bearing ring 27. This electrical contactor will be seen to be U-shaped in form with two parallel and downwardly extending legs 36a, 36b which are closely spaced about the vertical axis A of the cylinder block 23 and float cylinder 26. The contactor is mounted within an inner hub 46 at the center of the cap and is rigidly secured thereto. At their lower ends, each of the depending arms 36a, 36b is provided with a radially inwardly directed projection 50 which is thus springingly engaged with the associated contact strips on the pc board 32.

The pc board 32 and the electrical circuitry 60 carried thereby are adapted to provide an output current through leads 62 out of the meter through a passageway 63 in base section 25a and connector 64 and to remotely located gauges whereby the gas flow can be continuously monitored. As previously mentioned, the pc card is mounted to the base section 25a by means of a pair of screws 33 so that it extends in a plane exactly passing through the central axis A of the float cylinder 26. As can be seen in FIG. 1, the screws 33 serve to mount the pc board against a flat surface 55 with a second surface 54 of the base section extending at a right angle to surface 55 to position the side edge of the pc board so that the resistive potentiometer strip 37 on the pc board will be precisely positioned adjacent the center of the cylinder 26. The screws 33 also provide the electrical connection between the electrical leads 62 and the electrical circuitry 60 (see FIG. 3). The contactor 36 serves to complete a circuit from the resistive potentiometer strip 37 to a printed contact strip 53 on the backside of the pc card (FIG. 4) connected to the electrical circuitry 60 through the pc card as shown. The resistive potentiometer strip 37 is connected with the electrical circuitry 60 at its bottom end (FIG. 3) and is further connected to the circuitry through a parallel printed contact strip 52 at the other end. The resistance value provided by the resistive potentiometer strip 37 between the contactor 36 and circuitry 60 will thus be determined by the position at which the projection 50 of contactor leg 36a contacts the strip along the length thereof. While there are numerous circuits utilizing a resistive potentiometer to provide a linear current output proportional to the movement of the mechanical slider portion of the resistive potentiometer element, a particularly useful circuit is disclosed in my co-pending application entitled "Circuit for Generating a Current Linearly Proportional to Displacement of a Movable Member", Ser. No. 44,020, filed on even date herewith. The disclosure of this application is hereby specifically incorporated by reference into the disclosure of the current application. It will be seen that the resistive potentiometer strip 37 is tapered from bottom to top so that as the float cylinder 26 moves upwardly the current controlled by the strip 37 will increase proportionately when it works with the electrical circuitry of the aforesaid copending patent application.

It is an important feature of the present invention that the variable sensing element, i.e., the contactor 36 and the associated resistive potentiometer strip 37 be located at or closely spaced about the vertical axis A of the float cylinder 26 (FIG. 3) so that there are minimal lateral forces imposed on the cylinder tending to introduce inaccuracies into the readings as the cylinder 26 moves between its uppermost and lowermost positions (FIG. 2).

Another important feature of the present invention is the provision for both a visual as well as an electrical indication of gas flow through the meter. The visual indication is provided by the inclusion of the visual indicator pole 40 in the upper chamber of the meter within the transparent cover 28 so that the flow rate can be visually read at the same time that an electrical signal is sent to a remote monitoring point from the circuitry 60. As can be best seen in FIG. 2, the pole 40 is marked off in uniform increments (each indicative of a particular flow rate) with the lower edge of the flange 38a of cap 38 being the movable marker which provides the visual reading. It will be recognized that the pole 40 thus provides a dual function of both indicating the flow rate as well as guiding the movable cylinder 26 and preventing its rotation (by means of the notch 39 within the flange 38a).

A second embodiment 20A of the invention is shown in FIG. 5 wherein it will be seen that the basic mechanical structure of the meter is generally the same, with like parts to the first described embodiment being given like reference numbers, but with the variable sensor element being different from the sensor element of the first described embodiment. In the flow meter 20A of FIG. 5, the resistive potentiometer sensing structure and its associated circuitry have been changed to a variable capacitive sensing means with associated circuitry. This has necessitated some minor changes in the telescoping cylinder mechanical arrangement. Thus, a conductive metal cap 138 covers the top of the float cylinder 26, and centrally attached to the cap to extend downwardly therefrom along the cylinder axis A is a metallic rod 70. Positioned axially within the cylinder 26 is a fixed metallic cylinder 72 which is securely fastened by screws 73 as shown to a forwardly projecting segment 25b of the lower base section 25. The cylinder is precisely positioned about the axis A by its securement within a notch 74 in the vertical face 75 of the lower base projection 25b. The fixed cylinder 72 is electrically connected to electrical circuitry 60a (as shown) and a second electrical connection to the circuitry 60a is made, as shown, through a passage 76 in base cylinder block 23 to the bearing ring 27. It will thus be appreciated that one side of a conductive circuit passes through the bearing ring 27, metallic cylinder 26, and metal cap 138 to the depending rod 70 while the other side of the circuit is made directly to the fixed tube 72 from the circuitry 60a. As the float cylinder 26 rises from its support on the bearing ring 27, it will be appreciated that the capacitance between downwardly projecting rod 70 and the upwardly projecting tube 72 will be reduced since a decreased flux path is provided. This variable capacitor structure is electrically connected to an electrical circuit 60a as aforedescribed so that the circuitry can provide an output current signal which is linearly proportional to the amount of movement of the capacitive rod 70. While there are numerous circuits designed to provide such a result, a particularly useful circuit is disclosed in my prior U.S. Pat. No. 3,869,676, issued Mar. 4, 1975. The disclosure of the aforementioned patent is hereby specifically incorporated by reference herein.

As can further be seen in FIG. 5, the electrical circuitry 60a is mounted on a pc card 77 which is individually affixed to the flat vertical face 75 of the lower base section projection 25b by means of a pair of screws 78. The screws also serve to make the electrical connection between the circuitry 60a and the lead wires 62 which are connected through a threaded connector plug 64 to remote monitoring circuitry adapted to receive a linear current signal indicative of flow through the meter as measured by the changing capacitance due to the upward movement of rod 70.

A third embodiment of the present invention is shown in FIG. 6 wherein an inductive sensor, rather than a resistive or capacitive sensor, is disclosed as the variable sensing means of the present invention. In the apparatus 20B there shown, the movable cylinder 26, its upper cap 138 and downwardly depending sensor rod 70 may be similar in structure to the corresponding elements of gas flow meter 20A (FIG. 5). The lower base section 25 is similar to that of gas flow meter 20A (FIG. 4) and includes a vertical face 75 extending adjacent the axis A of the movable cylinder 26. A tube 80 of insulative material is fixedly mounted within the movable cylinder 26 and about the axis A thereof, and a coil 82 extends along the length thereof adjacent to the sensor rod 70 in its lowered position. The tube 80 is fixed to the vertical face 75 within the notch 74 thereof by means of screws 76 as shown. If the cylinder 26 and/or the central rod 70 are made of a ferrous metal, then, as the cylinder 26 rises under increasing flow through the meter, the inductance in the coil 82 will correspondingly decrease thereby making the decrease in inductance a measure of the amount of motion in the float cylinder 26. If the cylinder 26 and/or the central rod 70 are made of a non-ferrous metal, then, as the cylinder 26 rises under increasing flow through the meter, the inductance in the coil 82 will correspondingly increase thereby making the increase in inductance a measure of the amount of motion in the float cylinder 26.

In order to measure this inductance, the ends of the coil are directed to an electrical circuit 60b (as shown) which is mounted on a pc card 88 that is attached to the face 75 by means of a pair of screws 78. As with the previously described embodiments, such screws 78 also serve to connect the electrical circuitry 60b with the electrical leads 62 for communication with a remote monitoring point through the connector plug 64. While various circuits may be used to provide a linear output current signal proportional to the movement of the sensor rod 70 and the change in inductance induced thereby, a particularly useful series of circuits may be found in the Electrical Engineers Handbook, McGraw Hill, Second Edition, 1982, by D. G. Fink and D. Christianson (FIG. 1748, A through E).

Although the best modes contemplated for carrying out the present invention have been herein shown and described, it will be apparent that other modifications and variations may be made without departing from what is regarded to be the subject matter of the invention.

What is claimed is:

1. A gas flow meter comprising a base, a pair of telescoping coaxial cylinders having a common vertical axis, one of said cylinders being axially movable with respect to the other cylinder and said other cylinder being fixed with respect to said base, said movable cylinder having a cap at its upper end, means for mounting the cylinders in close sliding engagement so that gas flow may not pass therebetween, said base being arranged to support the movable cylinder in its lowermost position, means for directing gas to the inner of the cylinders, one of the cylinders having a vertically extending opening in it side wall to allow an increasing flow of gas to pass therethrough as the movable cylinder is lifted by the differential pressure of the gas flow through the meter, means defining an outlet for directing gas flow out of the meter when it has passed through said opening, a variable sensor element having a fixed portion thereof mounted to said base, said sensor element including a moveable member connected to the cap of said movable cylinder and extending downwardly therefrom along the vertical axis of and within the cylinder, said movable member of the sensor element being arranged to move axially along said fixed portion of the sensor element, electrical circuitry connected to said sensor element to produce an output signal directly proportional to the amount of lift of the movable cylinder and the gas flow through the meter, an indicator element mounted to the top of the movable cylinder, and a linear scale fixed with respect to the base and extending upwardly from the indicator element when the indicator element is in its lowermost position and directly adjacent to the indicator element and parallel to the cylinder axis to provide a visual indication of gas flow through the meter.

2. A gas flow meter according to claim 1 wherein said movable member of the sensor element comprises an electrically conductive member having a pair of downwardly projecting ends, one end engaging said fixed sensor element portion and the other end engaging an electrical contact to complete a circuit through said electrical circuitry.

3. A gas flow meter according to claim 1 wherein said indicator element comprises a portion of said cap.

4. A gas flow meter according to claim 1 wherein said fixed portion of the variable sensor element comprises a longitudinally tapered contact strip of conductive material on an insulating board and wherein said movable member of the sensor element comprises a conductive member with a first projecting end for establishing electrical contact with said contact strip at positions longitudinally therealong, said insulating board having a second contact strip mounted thereon, and said conductive member having a second projecting end for continuous sliding contact with said second contact strip to complete a circuit to said electrical circuitry.

5. A gas flow meter according to claim 4 wherein said movable member of the sensor element comprises a U-shaped member depending from said cap with said first and second projecting ends extending downwardly and adapted to engage said first and second contact strips on opposite sides of the insulating board about the longitudinal axes of the cylinders.

6. A gas flow meter according to claim 1 wherein said variable sensor element comprises a capacitive transducer including a conductive structure spaced outwardly of the vertical axis and fixed with respect to said base and wherein said movable member thereof comprises a conductive member extending along said vertical axis.

7. A gas flow meter according to claim 6 wherein said fixed portion of the variable sensor element comprises a coaxial cylinder and said movable member thereof comprises a rod.

8. A gas flow meter according to claim 1 wherein said fixed portion of the variable sensor element comprises an inductive transducer including a coil extending coaxially of the cylinders and fixed with respect to said base and wherein said movable member of the sensor element comprises a conductive member extending axially of the coil.

9. A gas flow meter comprising a base, a pair of telescoping coaxial cylinders having a common vertical axis, one of said cylinders being axially movable with respect to the other cylinder and said other cylinder being fixed with respect to said base, means for mounting the cylinders in close sliding engagement so that gas flow may not pass therebetween, said base being arranged to support the movable cylinder in its lowermost position, means for directing gas to the inner of the cylinders, one of the cylinders having a vertically extending opening in its side wall to allow an increasing flow of gas to pass therethrough as the movable cylinder is lifted by the pressure differential of the gas flow through the meter, means defining an outlet for directing gas flow out of the meter when it has passed through said opening, a variable sensor element positioned axially within one of said cylinders, said sensor element including a member dependingly attached to the movable cylinder at the vertical axis thereof and arranged to move axially with respect to the variable sensor element as the movable cylinder is lifted, and electrical circuitry connected to said sensor element to produce an output signal proportional to the amount of vertical displacement of the movable cylinder and the gas flow to said outlet, said variable sensor element including a contact strip of conductive material on an insulating board, said dependingly attached member comprising a conductive member with a first projecting end for establishing electrical contact with said contact strip at positions longitudinally therealong, said insulating board having a second contact strip mounted thereon, and said dependingly attached member having a second projecting end for continuous sliding contact with said second contact strip to complete a circuit to said electrical circuitry.

10. A gas flow meter according to claim 9 wherein said movable member has an axially extending passage therein and a cap across its upper end and wherein said dependingly attached member comprises a U-shaped member depending from said cap with said first and second projecting ends extending downwardly and adapted to engage said first and second contact strips on opposite sides of the insulating board.

11. A gas flow meter comprising a base, a pair of telescoping coaxial cylinders having a common vertical axis, one of said cylinders being axially movable with respect to the other cylinder and said other cylinder being fixed with respect to said base, means for mounting the cylinders in close sliding engagement so that gas flow may not pass therebetween, said base being arranged to support the movable cylinder in its lowermost position, means for directing gas to the inner of the cylinders, one of the cylinders having a vertically extending opening in its side wall to allow an increasing flow of gas to pass therethrough as the movable cylinder is lifted by the pressure differential of the gas flow through the meter, means defining an outlet for directing gas flow out of the meter when it has passed through said opening, a variable sensor element positioned axially within one of said cylinders, said sensor element including a member dependingly attached to the movable cylinder at the vertical axis thereof and arranged to move axially with respect to the variable sensor element as the movable cylinder is lifted, and electrical circuitry connected to said sensor element to produce an output signal proportional to the amount of vertical displacement of the movable cylinder and the gas flow to said outlet, said variable sensor element comprising a capacitive transducer including a conductive structure spaced outwardly of the vertical axis and fixed with respect to said base, and said dependingly attached member comprising a conductive member extending along said vertical axis.

12. A gas flow meter according to claim 11 wherein said variable sensor element comprises a coaxial cylinder and said dependingly attached member comprises a rod.

13. A gas flow meter comprising a base, a pair of telescoping coaxial cylinders having a common vertical axis, one of said cylinders being axially movable with respect to the other cylinder and said other cylinder being fixed with respect to said base, means for mounting the cylinders in close sliding engagement so that gas flow may not pass therebetween, said base being arranged to support the movable cylinder in its lowermost position, means for directing gas to the inner of the cylinders, one of the cylinders having a vertically extending opening in its side wall to allow an increasing flow of gas to pass therethrough as the movable cylinder is lifted by the pressure differential of the gas flow through the meter, means defining an outlet for directing gas flow out of the meter when it has passed through said opening, a variable sensor element positioned axially within one of said cylinders, said sensor element including a member dependingly attached to the movable cylinder at the vertical axis thereof and arranged to move axially with respect to the variable sensor element as the movable cylinder is lifted, and electrical circuitry connected to said sensor element to produce an output signal proportional to the amount of vertical displacement of the movable cylinder and the gas flow to said outlet, said movable cylinder having an axially extending passage therein and including a cap at its upper end, said dependingly attached member being secured to the cap to depend therefrom adjacent the cylinder axis, and said dependingly attached member having a pair of downwardly projecting ends one end engaging a fixed portion of said variable sensor element and the other end engaging an electrical contact to complete a circuit through said electrical circuitry.

14. A gas flow meter comprising a base, a pair of telescoping coaxial cylinders having a common vertical axis, one of said cylinders being axially movable with respect to the other cylinder and said other cylinder being fixed with respect to said base means for mounting the cylinders in close sliding engagement so that gas flow may not pass therebetween, said base being arranged to support the movable cylinder in its lowermost position, means for directing gas to the inner of the cylinders, one of the cylinders having a vertically extending opening in its side wall to allow an increasing flow of gas to pass therethrough as the movable cylinder is lifted by the pressure differential of the gas flow through the meter, means defining an outlet for directing gas flow out of the meter when it has passed through said opening, a variable sensor element including an electrically conductive strip positioned axially within the fixed one of said cylinders, said sensor element further including an electrical contactor dependingly attached to the upper end of the movable cylinder so as to extend downwardly adjacent the vertical axis thereof and arranged to contact and slide along the conductive strip as the movable cylinder is lifted, and electrical circuitry connected to said conductive strip to produce an output signal proportional to the amount of vertical displacement of the movable cylinder and the gas flow to said outlet.

15. A gas flow meter according to claim 14 wherein said opening is in a cylindrical wall of the movable cylinder.

16. A gas flow meter according to claim 15 wherein said opening comprises a series of vertically spaced openings in the cylinder wall.

* * * * *